UNITED STATES PATENT OFFICE.

OTTO LIEBKNECHT, OF FRANKFORT-ON-THE-MAIN, GERMANY, ASSIGNOR TO THE ROESSLER & HASSLACHER CHEMICAL CO., OF NEW YORK, N. Y., A CORPORATION OF NEW YORK.

PROCESS FOR THE MANUFACTURE OF ALKALIAMIDS.

1,359,080. Specification of Letters Patent. Patented Nov. 16, 1920.

No Drawing. Application filed January 29, 1915. Serial No. 5,128.

*To all whom it may concern:*

Be it known that I, OTTO LIEBKNECHT, a subject of the Emperor of Germany, and a resident of Frankfort-on-the-Main, Germany, have invented certain new and useful Improvements in Processes for the Manufacture of Alkaliamids, of which the following is a specification.

It is known that alkaliamid is produced by reacting with perfectly dry ammonia gas on alkali metal at a temperature of about 300–400° C.

I have found, however, that the statements in the literature published up to now concerning the known processes for the production of alkaliamid are not such as to indicate that said known processes are suitable for industrial application, inasmuch as a rapid and complete absorption of the ammonia is essential for the formation of alkaliamid, whereas under the old processes the reaction is rather incomplete and in many cases it takes place only in a very limited way.

It has taken a long time to overcome the many obstacles in establishing the causes of this unfavorable course of the reaction but finally I made the surprising observation that the reaction between ammonia and an alkali metal, such as sodium, is immensely influenced by accelerating agents and that a smooth, continuously even, operation of the process is possible only if care is taken to have such accelerating agents present during the reaction. As to accelerating agents (in the nature of "catalyzers"), I have found that primarily sodiumhydrate or sodiumoxid, as well as all such solid, liquid or gaseous bodies as are able to form alkalihydrate or alkalioxid, as for instance oxids or salts reducible by an alkali metal, come into consideration; furthermore air or steam. Though I do not wish to state an ultimate reason for this phenomenon I am inclined to assume that the oxygen in all these bodies serves as the accelerating or catalyzing force.

The fact that alkalihydrate especially acts as a good catalyzer, is all the more surprising inasmuch as it is in direct opposition to the opinion held up now by those skilled in the art, who have hitherto expressly insisted upon the application of dry ammonia, thus excluding the possibility of the formation of alkalihydrate.

It is noted that the compounds of chromium, especially those with the acids formed by the other metals of the chromium group, such a compound being for instance chromium tungstate, exert a stronger effect than, for instance, alkali hydrate.

I do not venture to make a definite statement, and therefore prefer to leave it an open question, whether or not the respective bodies can on their own account, act as accelerating agents or catalyzers or whether they are able to immensely increase the effect of the oxygen which may be present even in very minute quantities.

The effect of catalyzers in the manufacture of sodiumamid from metallic sodium is evident from the table given below. In each experiment there was applied from 2000–2200 grams of sodium to which ammonia gas was admitted at the rate of about 90 liters per 5 minutes. The reaction vessel consisted of a wrought iron crucible provided with an admission tube, a tube for the thermometer and an exit; the temperature prevailing was about 380° C.

| Quantity of catalyzer. | Decomposition of ammonia. |
|---|---|
| 0 | 50.3% |
| 5 g. NaOH | 59.3% |
| 10 g. NaOH | 65.7% |
| 20 g. NaOH | 76.7% |
| 40 g. NaOH | 87.7% |
| 60 g. NaOH | 97.2% |
| 60 g. cobaltoxid | 84.3% |
| 5 g. chromoxid | 89.2% |
| 5 g. chromiumtungstate | 97.9% |
| 5 g. NaOH+5 g. chromoxid | 97.6% |

The above table shows very plainly the effect of the catalyzer *per se* as well as the increase in the decomposition of ammonia caused by the increase in the quantity of the catalyzer; of the catalyzer mentioned in the table especially good results are shown by the chromium compounds as well as by mixtures of chromoxid and sodiumhydrate.

In reactions amenable to catalytic influence the desired result has usually been obtained by the presence of very minute quantities of catalyzers; the observation of the fact that in the present process an increase of the quantity of the catalyzers entails an increase of the desired results, is therefore of considerable importance.

It is probable that this peculiar phenomenon may be related to the surface-tension of the medium within which the reaction takes place. The maximum quantity of the catalyzers to be applied may be established according to the condition of each individual case.

The specific effects of the accelerating agents or catalyzers are of course not peculiar to the example given in connection with sodium amid, referred to above, but may be generally observed in processes for manufacturing alkaliamids from ammonia and alkali metals.

In conclusion I wish to state that in my new process the alloys of the alkalis may equally well be applied as the metals themselves, as for instance in the example of the process referred to above instead of metallic sodium, alloys of sodium may be applied, as for instance sodium amalgam, lead-sodium, etc.; in the case of applying alloys, such as the latter, the thermochemical conditions are somewhat changed and the reaction with ammonia is not quite as fast and smooth.

As the accelerating agents referred to may be themselves acted upon during the process, they do not constitute true catalyzers within the generally accepted definition of such, and, in the claims, I have used these terms with such distinction, in mind, viz., the word "catalyzer" as used in the claims indicates not only such substances as come within the narrower definition but also those coming within the broader definition.

I claim:

1. The process of manufacturing alkaliamids from ammonia and alkali-metals, consisting in causing the two bodies to react upon each other in the presence of a catalyzer.

2. The process of manufacturing alkaliamids from ammonia and alkali-metals, consisting in causing the two bodies to react upon each other in the presence of a catalyzer consisting of oxygen.

3. The process of manufacturing alkaliamids from ammonia and alkali-metals, consisting in causing the two bodies to react upon each other in the presence of a catalyzer containing oxygen.

4. The process of manufacturing alkaliamids from ammonia and alkali metals, consisting in causing the two bodies to react upon each other in the presence of an alkali compound containing oxygen.

5. The process of manufacturing alkaliamids from ammonia and alkali metals, consisting in causing the two bodies to react upon each other in the presence of an alkali oxid.

6. The process of manufacturing alkaliamids from ammonia and alkali metals, consisting in causing the two bodies to react upon each other in the presence of an alkali hydroxid.

7. The process of manufacturing alkaliamids from ammonia and alkali-metals, consisting in causing the two bodies to react upon each other in the presence of a catalyzer containing oxygen and capable of forming an alkali compound containing oxygen.

8. The process of manufacturing alkaliamids from ammonia and alkali-metals, consisting in causing the two bodies to react upon each other in the presence of a catalyzer containing oxygen and capable of forming an alkali oxid.

9. The process of manufacturing alkaliamids from ammonia and alkali-metals consisting in causing the two bodies to react upon each other in the presence of a catalyzer containing oxygen and capable of forming an alkali hydroxid.

10. The process of manufacturing alkaliamids from ammonia and alkali-metals, consisting in causing the two bodies to react upon each other in the presence of steam acting as a catalyzer, said catalyzer being capable of forming an alkali hydroxid with the alkali metal.

11. The process of manufacturing alkaliamids from ammonia and an alkali-metal, consisting in causing the two bodies to react upon each other in the presence of a metallic oxid acting as a catalyzer.

12. The process of manufacturing alkaliamids from ammonia and an alkali-metal, consisting in causing the two bodies to react upon each other in the presence of a mixture of substances containing oxygen.

13. The process of manufacturing alkaliamids from ammonia and an alkali-metal, consisting in causing the two bodies to react upon each other in the presence of a catalyzer comprising a chemical compound of substances, each capable of acting as a catalyzer.

14. The process of manufacturing alkaliamids from ammonia and an alkali-metal, consisting in causing the two bodies to react upon each other in the presence of a catalyzer and establishing a quantitative reaction by applying a maximum amount of the agent acting as a catalyzer.

15. The process of manufacturing sodiumamid from ammonia and metallic sodium, consisting in causing the two substances to react upon each other in the presence of sodium oxid as a catalyzer.

16. The process of manufacturing sodiumamid from ammonia and metallic sodium, consisting in causing the two substances to react upon each other in the presence of oxygen.

17. The process of manufacturing sodium-amid from ammonia and metallic sodium, consisting in causing the two substances to react upon each other in the presence of a substance capable of forming sodiumhydroxid.

18. The process of manufacturing sodium-amid from ammonia and metallic sodium, consisting in causing the two substances to react upon each other in the presence of steam, thereby producing sodium hydroxid.

In testimony whereof I have signed this specification in the presence of two subscribing witnesses.

OTTO LIEBKNECHT.

Witnesses:
  JEAN GRUND,
  CARL GRUND.